May 9, 1939. J. E. KIRK 2,157,612
POLICE GRAB
Filed Jan. 17, 1938 2 Sheets-Sheet 1

James E. Kirk
INVENTOR
BY Victor J. Evans & Co.
ATTORNEYS

May 9, 1939.  J. E. KIRK  2,157,612
POLICE GRAB
Filed Jan. 17, 1938  2 Sheets-Sheet 2
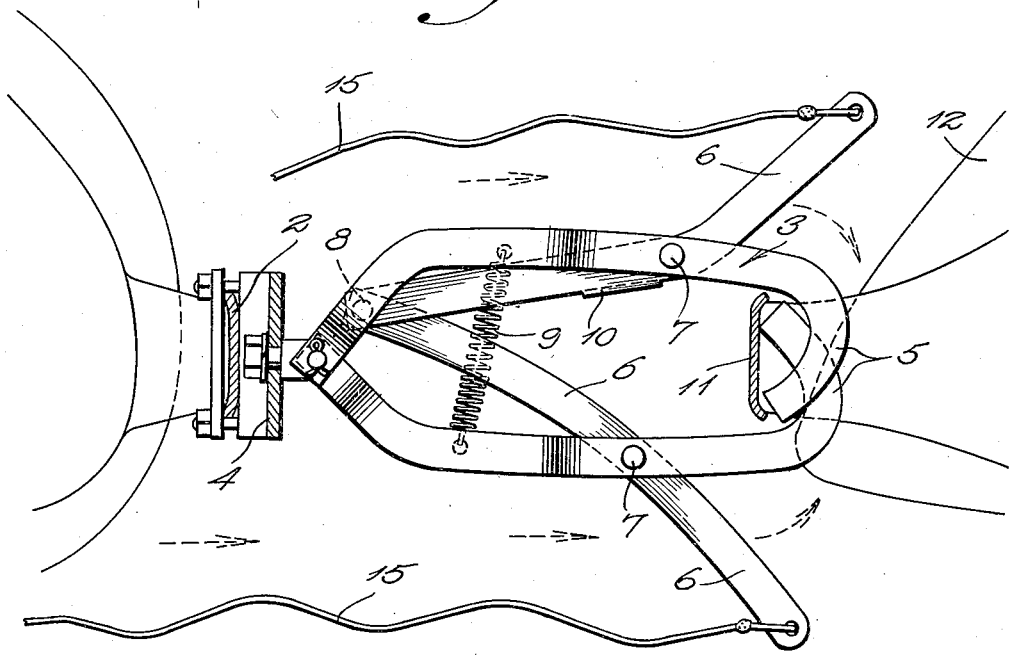
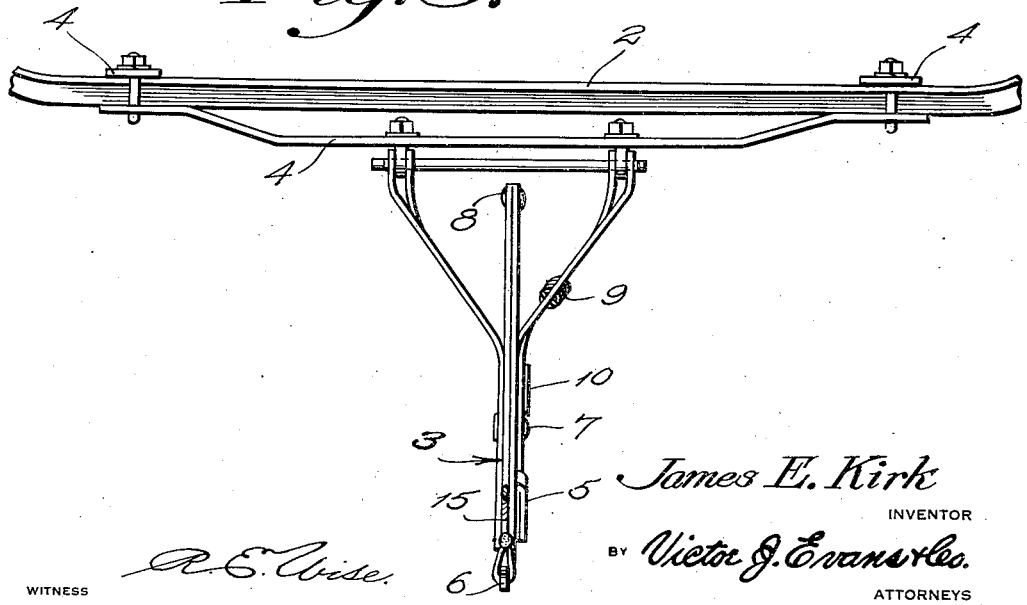
James E. Kirk
INVENTOR
BY Victor J. Evans & Co.
ATTORNEYS
WITNESS Patented May 9, 1939

2,157,612

UNITED STATES PATENT OFFICE 2,157,612

POLICE GRAB

James E. Kirk, Bremen, Ga.

Application January 17, 1938, Serial No. 185,449

2 Claims. (Cl. 294—110)

This invention relates to police grabs and has for the primary object the provision of a device especially adaptable for use on police motor cars whereby a police car equipped with this device and driven to overtake another car may become automatically secured thereto by said device contacting the rear bumper so that on the application of the brakes of the police car, the other car will be brought to a stop, the device being provided with a control easily reached by the driver of the police car to bring about release of the other car when desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation, partly in section, showing a car equipped with a grab constructed in accordance with my invention and also showing a fragmentary portion of the rear bumper of another car.

Figure 2 is a view similar to Figure 1 showing the device connecting two cars wherein said cars are only partially shown.

Figure 3 is a fragmentary top plan view illustrating the grab.

Figure 1:
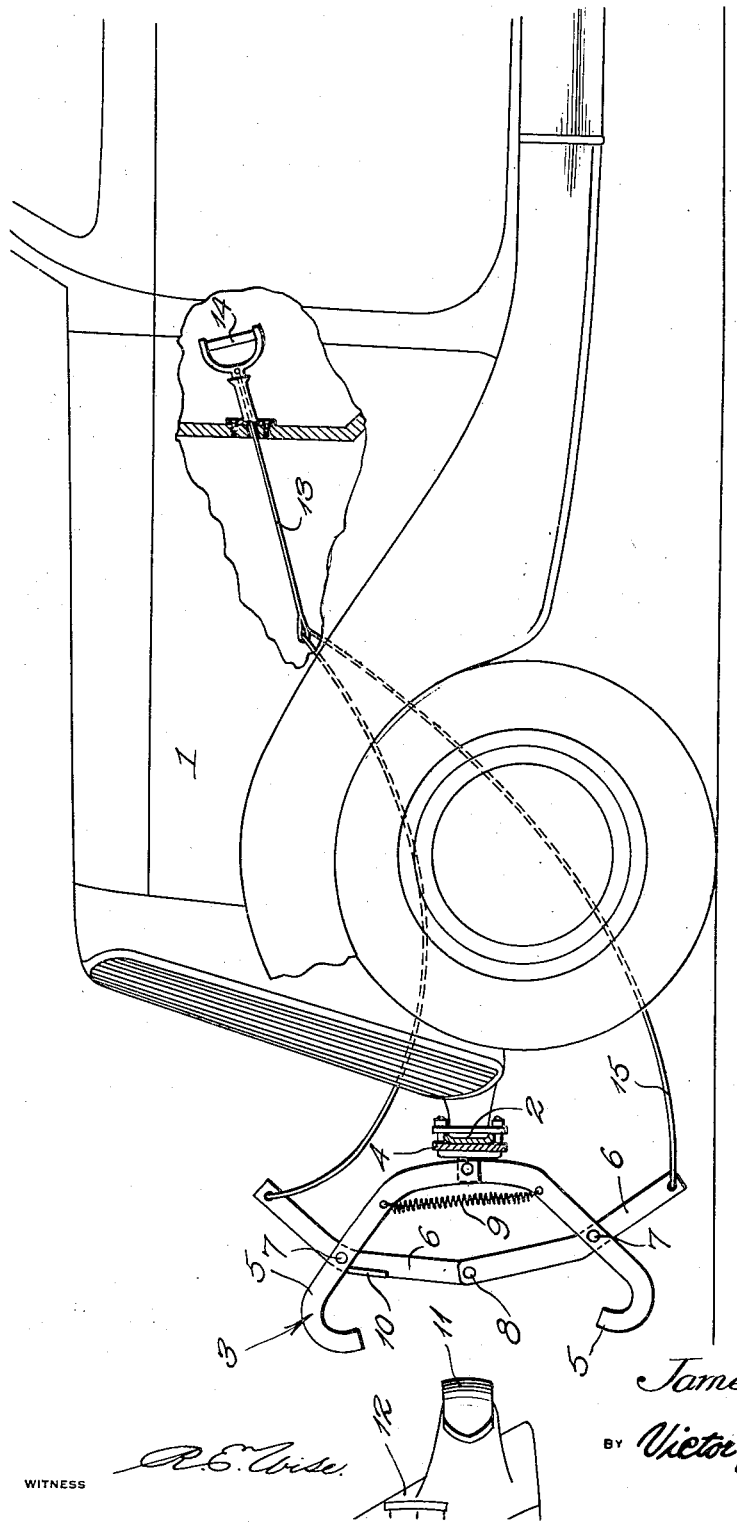

Referring in detail to the drawings, the numeral 1 indicates a police car and detachably mounted on the forward end of said car, preferably on the bumper 2 thereof is a grab 3. To render the mounting of the grab 3 conveniently on the bumper 2 a suitable bracket 4 is provided. The grab includes pivotally connected hook-shaped elements 5 and connecting members 6 pivoted on the hook-shaped elements, as shown at 7, and to each other, as shown at 8. The pivot between the hook-shaped elements mounts said elements on the bracket 4. The hooked-shaped elements are urged in the direction of each other by a spring 9. The connecting elements 6 have shoulders 10 to engage with the hook-shaped elements for retaining the latter in spread or open position against the influence of the springs when the pivot 8 is past dead center in one direction, as shown in Figure 1. The hook-shaped elements spread, as shown in Figure 1, may readily pass above and under the bumper 11 of another car 12 bringing the connecting members 6 into engagement with the bumper 11 with force of the car 1 overtaking the car 12 causing a pivotal movement of said connecting elements, transferring the pivot 8 thereof to an opposite side of the dead center position permitting the spring 9 to act to close the jaws about the bumper 11 and thereby connect the car 1 to the car 12. By applying the brakes on the car 1, the car 12 will be brought to a stop.

A suitable control 13 including a hand grip 14 is mounted on the car 1 in convenient reach of the driver and is connected to the ends of the connecting members 6 by flexible elements 15 so that by a pull on the hand grip 14 the connecting elements may be caused to pivot and bring about spreading or opening of the hook-shaped elements and thereby release the car 12 from the car 1.

A device of the character described and shown in the drawings is especially adaptable for a police car so that a policeman desiring to stop another car may overtake the latter-named car from the rear and when the connecting elements of the grab engage with the bumper of the preceding car will free the hook-shaped elements to move into closed or gripping position about the bumper of the preceding car by the action of the spring 9. When the cars have been secured together as described the policeman by applying the brakes of the police car can bring the other car to a stop.

What is claimed is:

1. A device of the character described, comprising, a pair of grab arms having rear ends pivoted together and adapted to be secured to the front end of a motor vehicle, said arms fashioned with front ends formed with hook-like sections disposed towards each other, a pair of bars having ends pivoted together, a pivot pin connecting each of said bars to one of said arms between the rear and front ends of the latter for maintaining the pivoted ends of said bars between said arms, the pivoted ends of said bars movable to a position laterally of a plane intersecting the axes of said pivot pins and towards said hook-like sections for maintaining said hook-like sections in extended position relative to each other for receiving therebetween the rear bumper of another motor vehicle whereby said bumper engages said pivoted ends of said bars to move the latter to a position on the opposite side of said plane to effect closing of said hook-like sections about said bumper, and a spring connecting said arms together for urging said hook-like sections towards each other.

2. A device of the character described, comprising, a pair of grab arms having rear ends pivoted together and adapted to be secured to the front end of a motor vehicle, said arms fashioned with front ends formed with hook-like sections disposed towards each other, a pair of bars having ends pivoted together, a pivot pin connecting each of said bars to one of said arms between the rear and front ends of the latter for maintaining the pivoted ends of said bars between said arms, the pivoted ends of said bars movable to a position laterally of a plane intersecting the axes of said pivot pins and towards said hook-like sections for maintaining said hook-like sections in extended position relatve to each other for receiving therebetween the rear bumper of another motor vehicle whereby said bumper engages said pivoted ends of said bars to move the latter to a position on the opposite side of said plane to effect closing of said hook-like sections about said bumper, and a spring connecting said arms together for urging said hook-like sections towards each other, one of said bars formed with a stop member adapted to engage one of said arms for limiting the first defined movement of said bars.

JAMES E. KIRK.